(12) United States Patent
Chen et al.

(10) Patent No.: US 11,466,035 B2
(45) Date of Patent: Oct. 11, 2022

(54) METHOD FOR MANUFACTURING SILVER-CARBON COMPOSITE

(71) Applicant: National Cheng Kung University, Tainan (TW)

(72) Inventors: Chia-Yun Chen, Taipei (TW); Po-Hsuan Hsiao, Tainan (TW); Ta-Cheng Wei, Tainan (TW)

(73) Assignee: National Cheng Kung University, Tainan (TW)

( * ) Notice: Subject to any disclaimer, the term of this patent is extended or adjusted under 35 U.S.C. 154(b) by 213 days.

(21) Appl. No.: 16/848,820

(22) Filed: Apr. 14, 2020

(65) Prior Publication Data
US 2021/0238199 A1 Aug. 5, 2021

(30) Foreign Application Priority Data
Feb. 3, 2020 (TW) .................. 109103184

(51) Int. Cl.
*C07F 1/00* (2006.01)
*A01N 59/16* (2006.01)
*B82Y 40/00* (2011.01)

(52) U.S. Cl.
CPC ............... *C07F 1/00* (2013.01); *A01N 59/16* (2013.01); *B82Y 40/00* (2013.01)

(58) Field of Classification Search
CPC ............... C07F 1/00; C07F 1/10; A01N 59/16
See application file for complete search history.

(56) References Cited

FOREIGN PATENT DOCUMENTS

| CN | 109221104 A | * | 1/2019 |
| CN | 109221104 A |   | 1/2019 |

OTHER PUBLICATIONS

Yang Rui-Qiao et al., Study on the Synthesis and Catalytic Performance of Gold Nanoparticles Prepared with Carbon Dots as Reductant, Journal of Natural Science of Hunan Normal University, Jul. 2015, pp. 48-51 and 62, vol. 38 No. 4, China, 2015/07.

* cited by examiner

*Primary Examiner* — Yong L Chu
(74) *Attorney, Agent, or Firm* — Winston Hsu

(57) ABSTRACT

A method for manufacturing a silver-carbon composite includes steps as follows. A carbon-containing solution is provided, wherein a carbon-containing material is subjected to a calcination step and is dissolved by a solvent to obtain the carbon-containing solution. The carbon-containing solution includes a plurality of carbon nanodots, and the carbon nanodots are negatively charged. A silver ion-containing solution is provided, wherein the silver ion-containing solution includes a plurality of silver ions. The carbon-containing solution and the silver ion-containing solution are mixed to obtain a mixed solution. The mixed solution is heated, such that at least one of the silver ions is reduced on at least one of the carbon nanodots to obtain the silver-carbon composite.

11 Claims, 3 Drawing Sheets
(1 of 3 Drawing Sheet(s) Filed in Color)

METHOD FOR MANUFACTURING SILVER-CARBON COMPOSITE

BACKGROUND OF THE INVENTION

1. Field of the Invention

The present disclosure relates to a silver-carbon composite, a method for manufacturing the same and an antibacterial liquid having the same, and more particularly, to a silver-carbon composite with a high stability, a method for manufacturing the same and an antibacterial liquid having the same.

2. Description of the Prior Art

Owing to small particle sizes, silver nanoparticles can freely enter cell membranes to destroy cells at low concentrations. Thus, the silver nanoparticles are widely used for sterilization.

The silver nanoparticles can be manufactured by a surface modification method, an electrochemical synthesis method, and a wet grinding and dispersing method. In the surface modification method, a reducing agent and a protecting agent are added in an aqueous solution of silver ions. With the reducing agent, the silver ions are reduced to silver metal. With the protecting agent, the silver nanoparticles can be prevented from agglomerating into large particles. In the electrochemical synthesis method, the anode is silver, the cathode is platinum, the electrolyte is an aqueous solution of silver ions, and a protecting agent is added in the electrolyte. When an electrical potential is applied to the anode and the cathode, the silver ions in the electrolyte are reduced to silver metal and deposited on the cathode. The protecting agent is used to enhance the dispersibility of the silver nanoparticles so as to obtain a silver nanoparticle colloidal solution. In the wet grinding and dispersing method, a silver slurry is put into a wet grinding and dispersing device and is ground by grinding balls. During grinding, a protecting agent is added to enhance the dispersibility of silver nanoparticles so as to obtain a silver nanoparticle colloidal solution. The aforementioned reducing agent can be sodium borohydride ($NaBH_4$), and the aforementioned protecting agent can be polyvinylpyrrolidone (PVP).

However, the protecting agent and the reducing agent used in the foregoing methods tend to cause environmental pollution. Specifically, PVP is a long chain polymer, which cannot be decomposed easily in nature, and the sodium borohydride is toxic. In addition, the silver nanoparticles manufactured by the foregoing methods have poor stability, and are difficult to preserve. Therefore, how to develop other silver-containing nanoparticles with antibacterial ability has become the goal of related industry and scholars.

SUMMARY OF THE INVENTION

According to one embodiment of the present disclosure, a method for manufacturing a silver-carbon composite is provided. The method for manufacturing the silver-carbon composite includes steps as follows. A carbon-containing solution is provided, wherein a carbon-containing material is subjected to a calcination step and is dissolved by a solvent to obtain the carbon-containing solution. The carbon-containing solution includes a plurality of carbon nanodots, and the carbon nanodots are negatively charged. A silver ion-containing solution is provided, wherein the silver ion-containing solution includes a plurality of silver ions. The carbon-containing solution and the silver ion-containing solution are mixed to obtain a mixed solution. The mixed solution is heated, such that at least one of the silver ions is reduced on at least one of the carbon nanodots to obtain the silver-carbon composite.

According to another embodiment of the present disclosure, a silver-carbon composite is provided. The silver-carbon composite is manufactured by the aforementioned method.

According to yet another embodiment of the present disclosure, an antibacterial liquid is provided. The antibacterial liquid includes the aforementioned silver-carbon composite.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The patent or application file contains at least one drawing executed in color. Copies of this patent or patent application publication with color drawing (s) will be provided by the Office upon request and payment of the necessary fee. The present disclosure can be more fully understood by reading the following detailed description of the embodiment, with reference made to the accompanying drawings as follows.

DETAILED DESCRIPTION

<Method for Manufacturing Silver-Carbon Composite>

Figure 1:
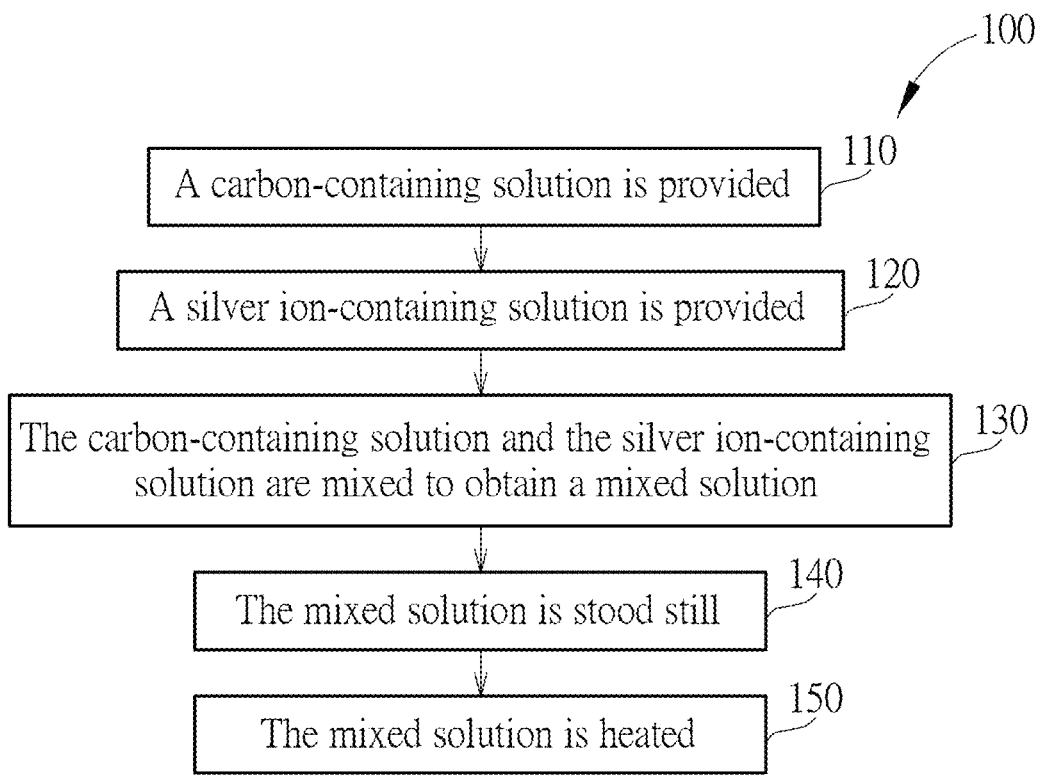
FIG. 1 is a flow diagram showing a method for manufacturing a silver-carbon composite according to one embodiment of the present disclosure.

In FIG. 1, a method 100 for manufacturing a silver-carbon composite includes Steps 110 to 150. In Step 110, a carbon-containing solution is provided. The carbon-containing solution includes a plurality of carbon nanodots. The carbon nanodots are negatively charged. Specifically, a zeta potential of the each of carbon nanodots can be in a range of −20 mV to −35 mV. A particle size of each of the carbon nanodots can be in a range of 1 nm to 50 nm. As such, the carbon nanodots are featured with good dispersibility, and the formation of the silver-carbon composite with larger particle size can be prevented. A concentration of the carbon-containing solution can be, but is not limited to, in a range of 0.05 mg/ml to 0.8 mg/ml.

Figure 2:
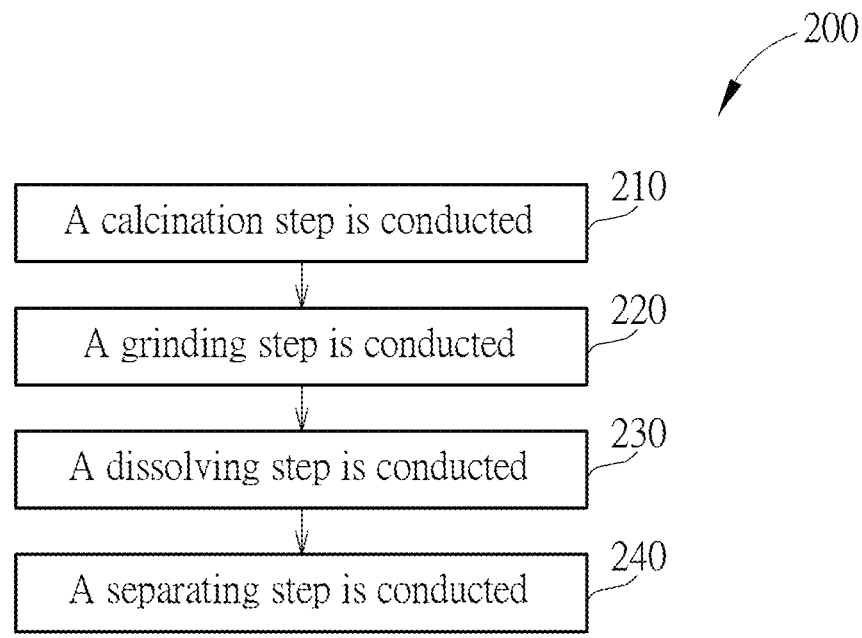
FIG. 2 is a flow diagram showing a method for manufacturing a carbon-containing solution according to one embodiment of the present disclosure.

In FIG. 2, the method 200 for manufacturing the carbon-containing solution can include Steps 210 to 240. In Step 210, a calcination step is conducted, wherein a carbon-containing material is heated to obtain a calcined carbon material. The carbon-containing material can be, but is not limited to, glucose, sucrose, chitosan, tea leaves (also called tea residue), coffee grounds or paper. The paper can be, but is not limited to, newspaper, toilet paper or A4 white paper. The calcination step is applied to carbonize the carbon-containing material by thermal decomposition, and the temperature and time for the calcination step can be adjusted according to the carbon-containing material. For example, the calcination step can be conducted at a temperature ranging from 250° C. to 375° C. for 1 hour to 3 hours. In Step 220, a grinding step is conducted, wherein the calcined carbon material is ground to obtain a ground carbon material. Step 220 can be conducted after the calcined carbon material obtained from Step 210 is cooled to room temperature. In Step 230, a dissolving step is conducted, wherein the ground carbon material is dissolved by a solvent, a portion of the ground carbon material is insoluble in the solvent and forms a precipitate. Specifically, when the carbon-containing material is treated with the calcination step, the product, i.e., the calcined carbon material, includes large particles and ultrafine particles. The ultrafine particles absorb on the larger particles and are rich in electronegative functional groups on their surfaces. As such, the ultrafine particles can be easily dissolved by polar solvents (or hydrophilic solvents), such as water. When the solvent (i.e., the polar solvent) is used to dissolve the ground carbon material, a liquid phase portion and a solid phase portion can be formed, wherein the large particles are insoluble or hardly soluble in the solvent to form the precipitate, i.e., the solid phase portion, and the ultrafine particles are dissolved and dispersed in the solvent to form the liquid phase portion. In Step 240, a separating step is conducted, wherein the precipitate is removed to obtain the carbon-containing solution. For example, the liquid phase portion and the solid phase portion can be separated by filter or dialysis. The liquid phase portion is the carbon-containing solution in Step 110.

Please refer back to FIG. 1. In Step 120, a silver ion-containing solution is provided, wherein the silver ion-containing solution includes a plurality of silver ions. The silver ion-containing solution can be obtained by dissolving silver-containing salts, such as silver nitrate, silver nitrite, and silver chloride, in a solvent, such as water. A concentration of the silver ion-containing solution can be, but is not limited to, in a range of 0.05 mg/ml to 1.2 mg/ml.

In Step 130, the carbon-containing solution and the silver ion-containing solution are mixed to obtain a mixed solution. Step 130 can be conducted at room temperature, and the carbon-containing solution and the silver ion-containing solution can be mixed uniformly by mechanical stirring, such as stirring by a glass rod.

In Step 140, the mixed solution is stood still, such that the silver ions and the carbon nanodots adsorb with each other. Specifically, the silver ions are positively charged, the carbon nanodots are negatively charged, such that the silver ions and the carbon nanodots can adsorb with each other. In other words, the carbon nanodots can function as a protecting agent. Accordingly, extra protecting agent is not required in the method 100 for manufacturing the silver-carbon composite according to the present disclosure. With Step 140, the adsorption degree between the silver ions and the carbon nanodots can be enhanced, which is favorable for the reduction of the silver ions on the carbon nanodots in Step 150, and can enhance the yield of the silver-carbon composite. However, the present disclosure is not limited thereto. In other embodiment, Step 140 can be omitted. Furthermore, Step 140 can be conducted at room temperature for 10 minutes to 1 hour.

In Step 150, the mixed solution is heated, such that at least one of the silver ions is reduced on at least one of the carbon nanodots to obtain the silver-carbon composite. Step 150 can be conducted at a temperature ranging from 70° C. to 110° C. for 70 minutes to 90 minutes. Furthermore, Step 150 need not be conducted under ultrasonic vibration and magnetic stirring. Specifically, the carbon nanodots are negatively charged and can provide electrons to the silver ion, such that the silver ion can be reduced on the surface of the carbon nanodots. That is, in the present disclosure, the carbon nanodots function as the reducing agent. Furthermore, with the silver ions reduced to silver metal on the surface of the carbon nanodots, the environmental resistance and biocompatibility of the silver metal can be enhanced.

According to the above description, in the present disclosure, the carbon nanodots function as the protecting agent and the reducing agent. The carbon nanodots can be manufactured by the carbon-containing material. The carbon-containing material can be natural carbon material. Comparing to the silver nanoparticles, which uses the sodium borohydride as the reducing agent and uses the long chain polymer as the protecting agent, the method 100 for manufacturing the silver-carbon composite according to the present disclosure has higher environmental compatibility. Furthermore, the sources of the carbon-containing material according to the present disclosure are abundant. When wastes such as tea leaves and coffee grounds are used as the carbon-containing materials, the wastes can be recycled into resources to achieve the circular economy.

<Silver-Carbon Composite>

According to the present disclosure, a silver-carbon composite is provided. The silver-carbon composite is manufactured by the method 100.

The silver-carbon composite according to the present disclosure has antibacterial property, and can be applied to the antibacterial field.

A zeta potential of the silver-carbon composite according to the present disclosure can be less than −40 mV. In general, when a material has a higher positive value of zeta potential of or a lower negative value of zeta potential, it represents the material has a higher stability. The zeta potential of conventional silver nanoparticles is in a range of −28 mV to −35 mV. That is, the stability of the silver-carbon composite according to the present disclosure is better than that of the conventional silver nanoparticles. Preferably, the zeta potential of the silver-carbon composite according to the present disclosure can be in a range of −48 mV to −57 mV.

A particle size of the silver-carbon composite according to the present disclosure can be in a range of 1 nm to 80 nm. That is, the silver-carbon composite is a nanomaterial. As such, the application of the silver-carbon composite can be broadened. For example, the silver-carbon composite can be added in raw material of living items, such as clothes, car seats and chairs, and the product manufactured thereof is featured with antibacterial property.

<Antibacterial Liquid>

According to the present disclosure, an antibacterial liquid is provided. The antibacterial liquid includes the aforementioned silver-carbon composite. Specifically, the antibacterial liquid can be the product of Step 150. Alternatively, the antibacterial liquid can be obtained by diluting the product of Step 150. Alternatively, the product of step 150 can be subjected to a drying step, such that the silver-carbon composite can be separated from the mixed solution, and then be mixed with a solvent to form the antibacterial liquid. Furthermore, the antibacterial liquid can be made into an antibacterial spray. For example, the antibacterial liquid can be filled in a commercially available spray bottle and thus can be sprayed out in the form of spray.

A concentration of the antibacterial liquid according to the present disclosure can be greater than or equal to $10^{-4}$ mg/ml. As such, the antibacterial liquid is featured with antibacterial ability. Preferably, the concentration of the antibacterial liquid can be in a range of 0.0005 mg/ml to 0.01 mg/ml.

<Preparation of Examples>

Example 1: a calcination step is conducted, in which 1 g of glucose is heated at 280° C. for 2 hours to obtain a calcined carbon material (Step 210). When the calcined carbon material is cooled, the calcined carbon material is ground by mortar and pestle to obtain a ground carbon material (Step 220). The ground carbon material is added in 100 ml of water and stirred by a glass rod to obtain a liquid phase portion and a solid phase portion (Step 230). The liquid phase portion is separated from the solid phase portion by filtering (step 240). The liquid phase portion is a carbon-containing solution including a plurality of carbon nanodots (Step 110).

A silver ion-containing solution is prepared by dissolving 10 mg of silver nitrate with 20 ml of water (Step 120). The carbon-containing solution and the silver ion-containing solution are mixed and stirred by a glass rod to obtain a mixed solution (Step 130). The mixed solution is stood still for 30 minutes (Step 410). The mixed solution is heated at 95° C. for 70 minutes (Step 150) to obtain a solution containing the silver-carbon composite.

Examples 2 to 8: the carbon-containing material of Example 1 is replaced by the carbon-containing material of Examples 2 to 8 shown in Table 1, and the temperature (T1) and time (t1) of the calcination step, the temperature (T2) and time (t2) for heating the mixed solution of Examples 2 to 8 are adjusted accordingly and are shown in Table 1. Other details for preparing Examples 2 to 8 can be the same as that of Example 1, such that the carbon nanodots and the silver-carbon composites of Examples 2 to 8 are obtained.

TABLE 1

| Example | 1 | 2 | 3 | 4 |
|---|---|---|---|---|
| carbon-containing material | glucose | sucrose | chitosan | tea leaves |
| T1 (° C.) | 280 | 300 | 315 | 250 |
| t1 (hr.) | 2 | 2 | 2 | 1.5 |
| T2 (° C.) | 95 | 100 | 70 | 110 |
| t2 (min.) | 70 | 70 | 70 | 90 |
| Example | 5 | 6 | 7 | 8 |
| carbon-containing material | coffee grounds | newspaper | toilet paper | A4 white paper |
| T1 (° C.) | 375 | 350 | 320 | 300 |
| t1 (hr.) | 1.2 | 1 | 1.5 | 3 |
| T2 (° C.) | 90 | 95 | 70 | 110 |
| t2 (min.) | 70 | 90 | 90 | 70 |

<Properties of Examples>

Figure 3:
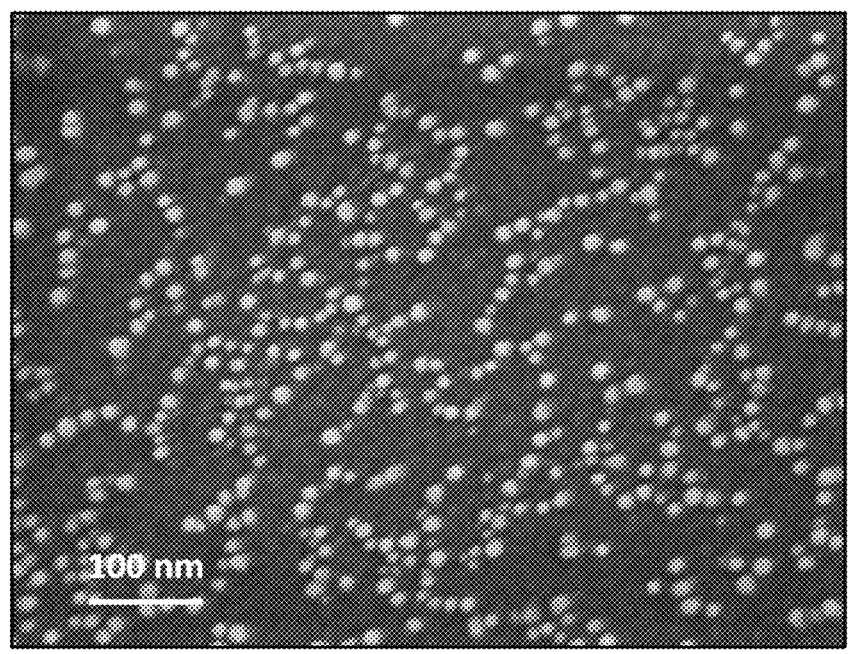
FIG. 3 is a scanning electron microscope (SEM) image of carbon nanodots of Example 1 according to the present disclosure.

The carbon-containing solution of Example 1 is observed by SEM. As shown in FIG. 3, a particle size of each of the carbon nanodots of Example 1 is in a range of 3 nm to 10 nm. An average particle size of the carbon nanodots of Example 1 is 5.88 nm. The carbon nanodots of Example 1 are subjected to zeta potential analysis. The zeta potential of the carbon nanodots of Example 1 is in a range of −24.36 mV to −31.43 mV.

Figure 4:
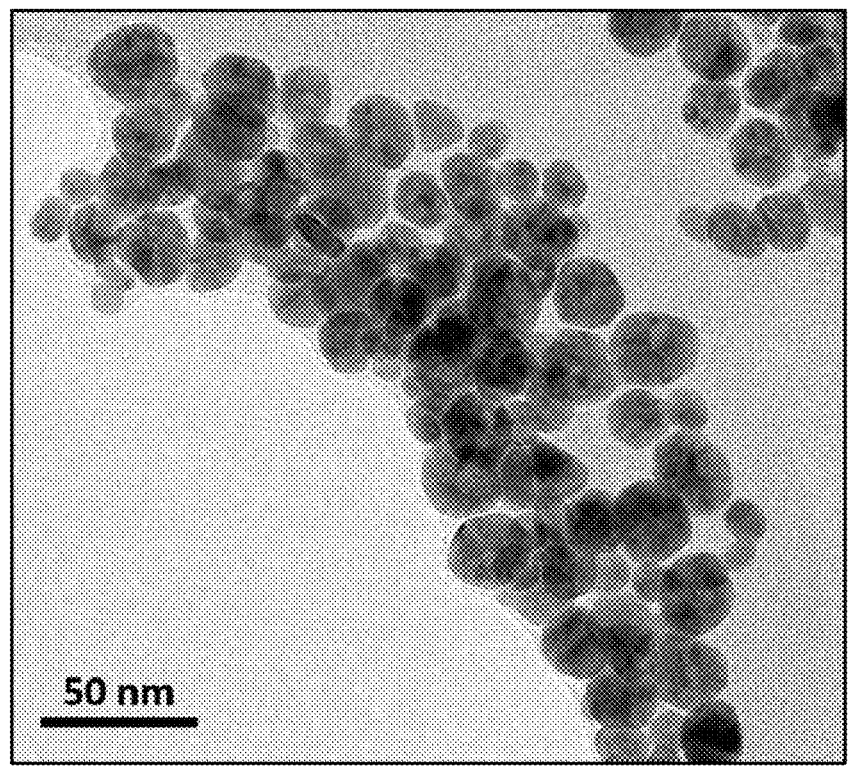
FIG. 4 is a transmission electron microscope (TEM) image of a silver-carbon composite of Example 1 according to the present disclosure.

The carbon-containing solution of Example 1 is observed by TEM. As shown in FIG. 4, a particle size of each of the silver-carbon composites of Example 1 is in a range of 13 nm to 35 nm. An average particle size of the silver-carbon composites of Example 1 is 17.31 nm. The silver-carbon composites of Example 1 are subjected to zeta potential analysis. The zeta potential of the silver-carbon composites of Example 1 is in a range of −51.73 mV to −56.76 mV.

The solution containing the silver-carbon composite of Example 1 is diluted with water to form a 0.004 mg/ml antibacterial liquid. An *Escherichia coli* sterilization test is carried out. The strain number of *Escherichia coli* is BCRC 11634; ATCC 8739.

TABLE 2

| Strain name | Inoculation amount (CFU/mL) | Interaction time | Bacteria amount after being treated with sample (CFU/mL) | sterilization rate R (%) |
|---|---|---|---|---|
| *Escherichia coli* | 1.2 × 10⁵ | 30 minutes | <1 | >99.9 |
|  |  | 24 hours | <1 | >99.9 |

As shown in Table 2, as for the antibacterial liquid of Example 1, the effect of interaction time of 30 minutes is comparable to the effect of interaction time of 24 hours. That is, the antibacterial liquid of Example 1 can achieve to high sterilization rate in a short time.

Figure 5:
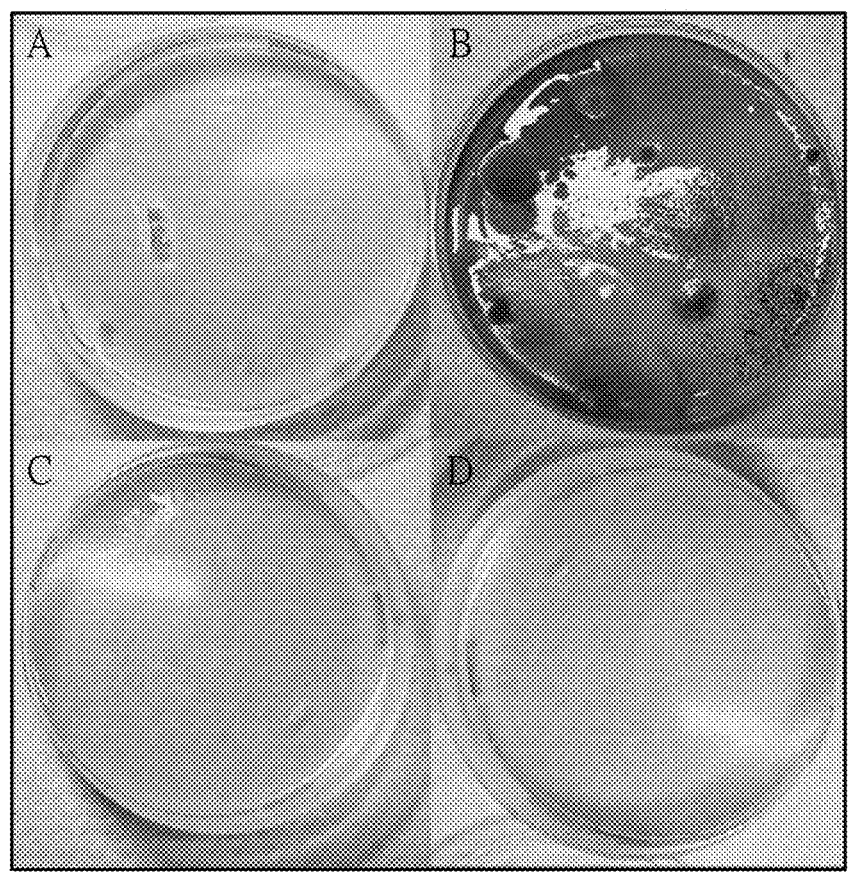
FIG. 5 shows results of culture medium antibacterial test of an antibacterial liquid of Example 1 according to the present disclosure and a control example.

The solution containing the silver-carbon composite of Example 1 is diluted with water to form a 0.004 mg/ml antibacterial liquid, and a culture medium antibacterial test is conducted. In FIG. 5, photo A and Photo B are the results of a control example, wherein the culture medium is not treated with the antibacterial liquid of Example 1. Photo A is taken on Day 0, and Photo B is taken on Day 14. As shown in photo A and photo B, after 14 days of cultivation, the bacterial colonies spread all over the culture medium. Photo C and Photo D are the results of Example 1, wherein the culture medium is treated with the antibacterial liquid of Example 1. Photo C is taken on Day 0, and Photo D is taken on Day 14. As shown in photo C and photo D, there was no growth of bacterial colonies, which shows the antibacterial liquid of Example 1 can provide good antibacterial effect. The antibacterial liquids of Examples 2-8 are subjected to the culture medium antibacterial test, and similar results are obtained. The results of Examples 2-8 are omitted herein for the sake of conciseness.

The carbon nanodots and the silver-carbon composites of Examples 2 to 8 are observed by SEM and TEM, and are subjected to zeta potential analysis. The results are listed in Table 3, wherein "PS" is the particle size, "$\overline{PS}$" is the average particle size, the units of "PS" and "$\overline{PS}$" are nanometer (nm), and "ZP" is the zeta potential.

TABLE 3

| Example | | 1 | 2 | 3 | 4 |
|---|---|---|---|---|---|
| carbon-containing material | | glucose | sucrose | chitosan | tea leaves |
| carbon nanodots | PS (nm) | 3 to 10 | 7 to 15 | 6 to 19 | 3 to 9 |
|  | $\overline{PS}$ (nm) | 5.88 | 10.56 | 13.77 | 5.43 |
|  | ZP (mV) | −24.36 to −31.43 | −26.1 to −31.12 | −26.31 to −31.73 | −24.12 to −29.88 |
| silver-carbon composites | PS (nm) | 13 to 35 | 17 to 42 | 21 to 53 | 10 to 62 |
|  | $\overline{PS}$ (nm) | 17.31 | 22.47 | 25.73 | 19.56 |
|  | ZP (mV) | −51.73 to | −50.73 to | −50.4 to | −48.73 to |

TABLE 3-continued

|  |  |  |  |  |  |
|---|---|---|---|---|---|
|  |  | −56.76 | −55.73 | −55.51 | −54.5 |
| Example |  | 5 | 6 | 7 | 8 |
| carbon-containing material |  | coffee grounds | newspaper | toilet paper | A4 white paper |
| carbon nanodots | PS (nm) | 4 to 27 | 12 to 36 | 7 to 26 | 18 to 25 |
|  | $\overline{PS}$ (nm) | 11.73 | 19.8 | 15.43 | 23.1 |
|  | ZP (mV) | −23.5 to −29.18 | −26.37 to −30.4 | −25 to −29.1 | −23.6 to −30.13 |
| silver-carbon composites | PS (nm) | 16 to 68 | 28 to 71 | 18 to 47 | 25 to 45 |
|  | $\overline{PS}$ (nm) | 22.1 | 35.32 | 19.53 | 31.2 |
|  | ZP (mV) | −49.9 to −54.4 | −49.72 to −56 | −50.2 to −55 | −4 9 to −54.23 |

To sum up, in the method for manufacturing the silver-carbon composite according to the present disclosure, there is no need to use sodium borohydride as the reducing agent, and there is no need to use long chain polymer as the protecting agent. Accordingly, it can reduce the harm to the environment. The silver-carbon composite according to the present disclosure has excellent antibacterial ability and has good stability for preservation. The silver-carbon composite can be used to prepare an antibacterial liquid to disinfect living items.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for manufacturing a silver-carbon composite, comprising:
   providing a carbon-containing solution, wherein a carbon-containing material is subjected to a calcination step and is dissolved by a solvent to obtain the carbon-containing solution, the carbon-containing solution comprises a plurality of carbon nanodots, and the carbon nanodots are negatively charged;
   providing a silver ion-containing solution, wherein the silver ion-containing solution comprises a plurality of silver ions;
   mixing the carbon-containing solution and the silver ion-containing solution to obtain a mixed solution; and
   heating the mixed solution, such that at least one of the silver ions is reduced on at least one of the carbon nanodots to obtain the silver-carbon composite.

2. The method for manufacturing the silver-carbon composite of claim 1, prior to heating the mixed solution, further comprising:
   standing still the mixed solution, such that the silver ions and the carbon nanodots adsorb with each other.

3. The method for manufacturing the silver-carbon composite of claim 1, wherein a method for manufacturing the carbon-containing solution comprises:
   conducting the calcination step, wherein the carbon-containing material is heated to obtain a calcined carbon material;
   conducting a grinding step, wherein the calcined carbon material is ground to obtain a ground carbon material;
   conducting a dissolving step, wherein the ground carbon material is dissolved by the solvent, a portion of the ground carbon material is insoluble in the solvent and forms a precipitate; and
   conducting a separating step, wherein the precipitate is removed to obtain the carbon-containing solution.

4. The method for manufacturing the silver-carbon composite of claim 1, wherein the calcination step is conducted at a temperature ranging from 250° C. to 375° C. for 1 hour to 3 hours.

5. The method for manufacturing the silver-carbon composite of claim 1, wherein heating the mixed solution is conducted at a temperature ranging from 70° C. to 110° C. for 70 minutes to 90 minutes.

6. The method for manufacturing the silver-carbon composite of claim 1, wherein the carbon-containing material is glucose, sucrose, chitosan, tea leaves, coffee grounds or paper.

7. The method for manufacturing the silver-carbon composite of claim 1, wherein a zeta potential of the each of carbon nanodots is in a range of −20 mV to −35 mV.

8. The method for manufacturing the silver-carbon composite of claim 1, wherein a particle size of each of the carbon nanodots is in a range of 1 nm to 50 nm.

9. The method for manufacturing the silver-carbon composite of claim 1, wherein a zeta potential of the silver-carbon composite is less than −40 mV.

10. The method for manufacturing the silver-carbon composite of claim 1, wherein a zeta potential of the silver-carbon composite is in a range of −48 mV to −57 mV.

11. The method for manufacturing the silver-carbon composite of claim 1, wherein a particle size of the silver-carbon composite is in a range of 1 nm to 80 nm.

* * * * *